United States Patent [19]

Anderson

[11] Patent Number: 4,503,950
[45] Date of Patent: Mar. 12, 1985

[54] BRAKE ACTUATOR-ADJUSTER MECHANISM

[75] Inventor: Bruce W. Anderson, Niles, Mich.

[73] Assignee: Allied Corporation, Morristown, N.J.

[21] Appl. No.: 513,510

[22] Filed: Jul. 13, 1983

Related U.S. Application Data

[63] Continuation-in-part of Ser. No. 271,453, Jan. 27, 1983, abandoned.

[51] Int. Cl.$^3$ .................. F16D 65/38; F16D 55/02; F16D 13/75; B21B 17/02
[52] U.S. Cl. .................. 188/196 R; 72/370; 188/71.8; 192/111 A
[58] Field of Search .............. 188/71.8, 196 R, 196 P; 192/111 A; 92/13; 72/370, 702; 74/59, 370, 492

[56] References Cited

U.S. PATENT DOCUMENTS

| | | | |
|---|---|---|---|
| 3,542,165 | 11/1970 | Lucien | 188/196 P |
| 3,958,670 | 5/1976 | Anderson | 188/196 R |
| 3,990,547 | 11/1976 | Plaat | 188/196 R |
| 4,180,147 | 12/1979 | Tjarkson et al. | 188/196 P X |
| 4,192,407 | 3/1980 | Crossman | 188/71.8 X |
| 4,449,616 | 5/1984 | Musser, Jr. et al. | 188/196 R X |

Primary Examiner—Bruce H. Stoner, Jr.
Assistant Examiner—Robert J. Oberleitner
Attorney, Agent, or Firm—Leo H. McCormick, Jr.; Ken C. Decker

[57] ABSTRACT

In a brake booster (10) for an aircraft having an adjuster mechanism (24) with a tubular member (54) that engages a head (62) of a stem (40) to hold an actuator (20) in a fixed rest position after each brake application. The tubular member (54) has a plurality of openings (58, 58' ... 58$^N$) located at various intervals along its axis. The head (62) engages the tubular member to sequentially expand the material between the openings (58, 58' ... 58$^N$) on movement of the actuator (20) toward the friction disc in a brake. After the head (62) has passed an opening (58, 58' ... 58$^N$), the modulus of elasticity of the material is such that the material contracts to a neck down diameter that is substantially equal to the initial diameter of the tubular member (54) to constrain the tubular member (44) with respect to stem (40). Thereafter, any force which attempts to move actuator (20) from the rest position must be substantially equal to the actuation force.

6 Claims, 5 Drawing Figures

BRAKE ACTUATOR-ADJUSTER MECHANISM

BACKGROUND OF THE INVENTION

This is a continuation-in-part of application Ser. No. 271,453 filed Jan. 27, 1983, now abandoned.

This invention relates to a brake for an aircraft having an adjuster mechanism that prevents an external force from moving an actuator mechanism from a rest position.

As disclosed in U.S. Pat. No. 3,376,959 it is common practice to provide aircraft wheel brakes with an adjuster mechanism to compensate for wear of the friction lining. Such adjuster mechanisms include a plurality of reset devices interspersed between a corresponding plurality of actuator pistons attached to a pressure plate through which a brake force is applied to a stack of friction discs. Unfortunately, after repeated brake applications, the pressure plate may become distorted because of unequal thermal and brake forces applied thereto by the individual actuator pistons or uneven wear of the individual friction linings in the disc brakes.

To reduce the possibility of distorting the pressure plates or introducing uneven lining wear it was found, as disclosed in U.S. Pat. No. 3,958,670, that by locating a reset device in an individual actuator, the forces on the pressure plate are essentially coaxial.

This device does not counter forces which can occur opposite the normal direction of brake actuation. Under loss of airplane hydraulic system back pressure, heat stack inertia forces can push pistons back to the original rest position. Brake discs can then skew excessively which increases disc damage potential during landing and wheel spin-up.

SUMMARY OF THE INVENTION

The present invention provides each actuator mechanism with an adjuster mechanism having a tubular member. The tubular member has a plurality of openings in a radial plane at selected positions along its axis. The actuator mechanism after overcoming a spring engages and moves the tubular member with respect to a head on a stem. Movement of the tubular member radially expands the tubular member until movement of actuator mechanism terminates. Thereafter, the spring returns the actuator to a rest position. After the head has passed the openings in a radial plane, the material in the tubular member contracts to a neck down diameter. The modulus of elasticity of the tubular member is such that the neck down diameter is substantially equal to the initial diameter of the tubular member. Thus, each actuator is constrained in a rest position that is in a radial plane perpendicular to the axis of the axle of the aircraft. In addition, under loss of aircraft hydraulic system back pressure, the actuator is constrained from movements toward the pressurizing chamber. These movements could normally have been caused by heat stack inertia forces during flight. With this actuation mechanism, heat stack discs skewing is prevented thus decreasing the possibility of disc damage during landing and tire spin-up.

An advantageous effect of this invention occurs since the volumetric fluid required to fully stroke an actuator mechanism and effect a brake application remains substantially constant irrespective of movement of an adjuster caused by wear of the friction disc.

Another advantage of this invention is provided to an aircraft brake with an adjuster mechanism that prevents skewing of the pressure plate and thereby avoids adverse loads on the brake/wheel/landing gear system during landing.

It is an object of this invention to provide a disc brake reset mechanism with a tubular member with neck down diameter that engages a fixed head member to hold an actuator in a constrained rest position by opposing any forces that act on the tubular member and attempt to move the tubular member by expanding the neck down diameter.

It is a further object of this invention to provide an adjuster mechanism with a tubular member having a plurality of openings in a radial plane at selected intervals along the axis of the tubular member. The tubular member is moved with respect to a head on a fixed stem by expanding the material between the plurality of openings. The modulus of elasticity of the expanded material is such that on movement of the head past the plurality of openings the material returns to a neck down diameter that is substantially equal to the initial diameter of the tubular member. The neck down diameter offer resistance to prevent the tubular member from moving back to its original position with respect to the head on the stem.

These advantages and objects should be apparent from reading this specification while viewing the drawings.

DETAILED DESCRIPTION OF THE INVENTION

Figure 1:
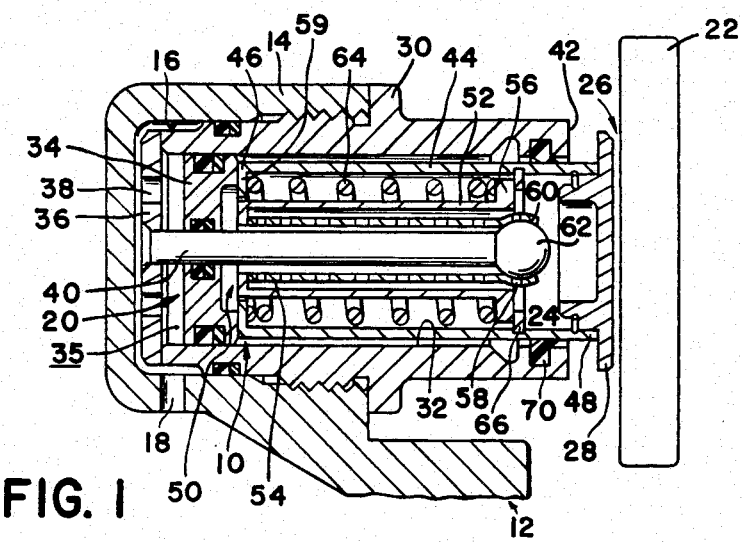
FIG. 1 is a sectional view of a brake actuator-adjuster mechanism made according to the principles of this invention.

The actuator-adjuster mechanism 10 shown in FIG. 1 is part of a brake system designed for use in a conventional aircraft wheel and multiple disc brake assembly. The wheel is rotatably journaled on a bearing located on a fixed axle carried by the landing gear structure. An annular brake carrier 12 is secured in a nonrotatable position relative to the fixed axle by a mounting flange on landing gear brake rod and is connected to a torque tube having a backing plate by bolts.

The brake carrier 12 has a housing 14 with a plurality of cavities or bores 16 located therein, only one of which is shown. Cavities 16 are fluidly connected via passage 18 to a source of pressurized fluid, not shown, controlled by the aircraft pilot.

An actuator-adjuster mechanism 10 is located in each cavity or bore 16. The actuator mechanism 20 is held away from the pressure plate 22 by the reset adjuster mechanism 24 to establish an air gap 26 between the pressure plate 22 and actuator mechanism 20. The primary purpose for the gap is to avoid brake dragging. Also, as disclosed in U.S. Pat. No. 4,180,147 this air gap forms a barrier to reduce the transfer of thermal energy created during a brake application from being transferred to the actuator mechanism 20 and prevent degradation of the actuator by heat. Unfortunately during a brake application, the movement of the brake actuator through this air gap represents lost motion that requires certain volume of fluid to bring end cap 28 into engagement with pressure plate 22 and the pressure plate into engagement with the friction disc. Therefore, the air gap is normally maintained at a minimum. Should the stack of friction discs and pressure plate 22 expand through thermal energy after a brake application, the air gap may be eliminated and a force applied to end cap 28. The adjuster mechanism 24 shown in FIG. 1 holds the actuator mechanism 20 in a constrained position to assure that the full actuator stroke remains substantially constant after each brake application.

Each actuator mechanism 20, only one of which is shown, has a cylindrical liner 30 that is attached to the housing 14 to establish a smooth bore 32 in cavity 16. A piston 34 located in bore 32 cooperates with liner 30 and housing 14 to define a chamber 35. A plate 36 located in cavity 16 has a plurality of openings 38 to allow fluid to freely flow between passage 18 and chamber 35. A stem 40 fixed to plate 36 extends through piston 34 to a point adjacent the end 42 of liner 30. A tube 44 of an insulator material has a first end 46 abutted against piston 34 and a second end 48 to which end cap 28 is fixed.

The adjuster mechanism 24 includes a tubular member 50 having first and second concentrically cylindrical members 52 and 54 abutted against each other. Cylindrical member 52 has a flange 56 on the end thereof that extends toward tube 44. Cylindrical member 54 has a plurality of circular openings 58, 58' . . . $58^N$ located at intervals along its axis. The cylindrical member 54 is made of 304 stainless steel made according to MIL-T-8504 specifications (military specification standard). The end 60 of cylindrical member 54 engages head 62 on stem 40. A spring 64 concentric to cylindrical member 52 engages flange 56 and 59 on end 46 of tube 44 to move piston 34 toward chamber 35 until stop 66 engages flange 56 to establish a rest position for actuator mechanism 20.

A wiper seal 70 attached to liner 30 engages tube 44 to assure that dust and/or friction dust does not enter bore 32 and score piston 34.

MODE OF OPERATION OF THE INVENTION

When a pilot of an aircraft desired to effect a brake application on an aircraft equipped with an actuator-adjuster mechanism 10 shown in FIG. 1, fluid under pressure is transmitted to chamber 35 by way of passage 18 and cavity 16. The fluid under pressure presented to chamber 35 acts on piston 34 and moves the first tube 44 toward the pressure plate 22 by overcoming spring 64 to close air gap 26.

Figure 2:
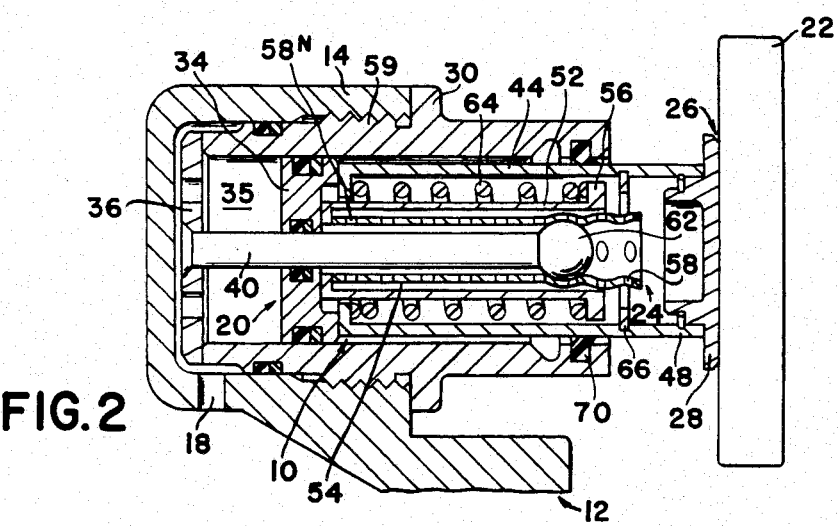
FIG. 2 is a sectional view of the actuator-adjuster mechanism of FIG. 1 in an operational position.

When the piston 34 has moved a distance equal to the air gap 26 and the running clearance, piston 34 engages end on the tubular member 50 to form a solid link as shown in FIG. 2. Thereafter, piston 34, in response to the fluid pressure in chamber 35, simultaneously moves the tube 44 and cylindrical members 52 and 54 toward the backing plate to compress the friction disc and effect a brake application.

When the pressure of the fluid in chamber 35 is relieved, spring 64 acts on flange 59 or end 46 to return the tube 44 and piston 34 to a position as illustrated in FIG. 1. Since the protective cap 28 is not attached to the pressure plate 22, an air gap 26 is again established and a conductive path for the transfer of thermal energy created during the brake application interrupted. In addition, since the first tube 44 is an insulator material, thermal energy transfer which could damage the seals on piston 34 is substantially eliminated and a potential failure of the actuator avoided.

Figure 3:
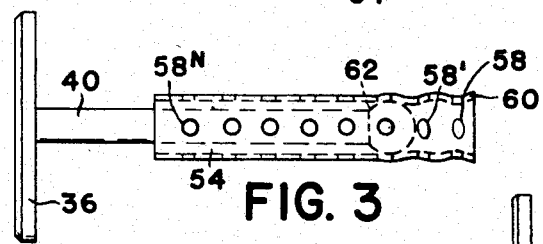
FIG. 3 is a side view of the stem and tubular member of the adjuster mechanism of FIG. 2.

After repeated brake applications, the friction discs are worn and reduced in thickness. However, the distance traveled by the piston 34 in bore 32 from the rest position to the actuation position remains the same through the operation of the adjuster mechanism 24. As shown in FIGS. 2 and 3, the movement of tubular member 54 toward the pressure plate 22 causes the material between adjacent openings 58, 58' . . . $58^N$ to sequentially expand on engagement with head 62. Initial openings 58, 58' . . . $58^N$ to sequentially expand on engagement with head 62. Initial openings 58, 58' . . . $58^N$ are circular, however, the modulus of elasticity is such that after the tubular material has expanded and contracts to a neck down diameter the openings 58, 58' . . . $58^N$ have an oval shape as illustrated in FIG. 3. The neck down diameter engages head 62 such that force is required to move tubular member 54 in either direction.

Thereafter should a force be applied to end cap 28 from thermal expansion of the brake components or axial inertia forces generated during aircraft maneuvers, the actuator 20 should be constrained to backward movement once end cap 28 engages end of tubular member 54 at end 60. After the brake components cool, the actuator-adjuster mechanism and pressure plate 22 assume a position similar to that illustrated in FIG. 1.

Figure 5:
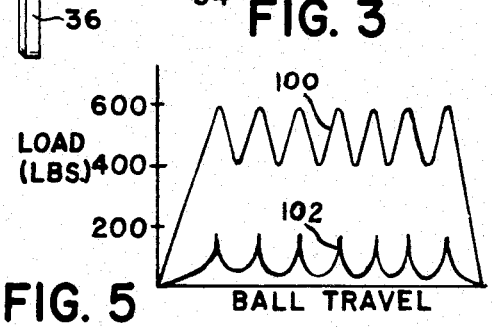
FIG. 5 is a graph showing the force required to move the adjuster mechanism.

To evaluate the holding ability of the neck down diameter, a force was applied to stem 40 causing head 62 to engage cylindrical member 54. As shown by curve 100 in FIG. 5, a force of approximately 600 psi was required to move head 62 between openings 58, 58' . . . $58^N$. When head 62 reached on opening the force required to move stem 40 was reduced to about 400 psi. When head 62 reached opening $58^N$, the force was reversed and head 62 moved toward opening 58. A force of approximately 100 psi was required to move head 62 between holes 58, 58' . . . $58^N$. This retention force of approximately 100 psi is sufficient to hold piston 36 in a stationary position for all anticipated operational activities experienced by the actuator mechanism 20.

By varying the position and size of holes in the radial plane as well as along the axis of tube element 52, the expansion in either direction may be controlled as required. As shown in FIG. 3, the neck down diameter has changed the configuration of the circular openings to an oval.

Figure 4:
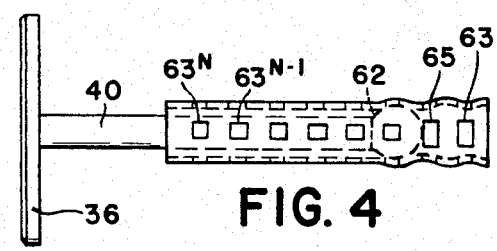
FIG. 4 is a side view of another tubulat member for use with the adjuster mechanism of FIG. 2.

Under some conditions and thickness for cylindrical members 54 it may be necessary to change the configuration of the openings to a non-circular pattern 63, 63' . . . $63^N$ as shown in FIG. 4 to provide the desired expansion forces. When the head 62 has passed through such a cylindrical member 54, the rectangular shape 63 assumes a different rectangular shape or parallelogram 65. By changing the size, shape and spacing of the openings, the neck down diameter can be controlled and thus the force required to move the actuator mechanism 20 from its rest position established.

I claim:

1. In a brake for an aircraft having a plurality of friction discs located between a pressure plate and a backing plate, an actuator mechanism for moving the pressure plate from a rest position toward the backing plate in response to an operational signal and an adjuster mechanism for positioning said actuator mechanism with respect to said backing plate to compensate for wear of the friction disc and thereby maintain a substantially uniform actuation stroke from the rest position, the improvement in the adjuster mechanism comprising:

a tubular member connected to said actuator mechanism, said tubular member having a plurality of openings in a radial plane at selected positions along the axis of the tubular member; and a stem having a head thereon, said head having a larger diameter than said tubular member, said actuator mechanism responding to an operational signal by overcoming a spring and engaging said tubular member after moving the pressure plate a predetermined distance from an initial rest position, said head thereafter radially expanding said tubular member until the movement of the pressure plate toward the backing plate terminates, said tubular member after being expanded contracting to a substantially uniform neck down diameter in a radial plane through said plurality of openings after the tubular member passes over said head, said spring returning said actuator mechanism to a new rest position with respect to said initial rest position corresponding to the movement of the tubular member and head, said pressure plate and backing plate being expanded by thermal energy generated in the friction disc during a brake application and exerting a thermal force on said actuator mechanism, said pressure plate and friction disc being subjected to inertia forces during various maneuvers of the aircraft in flight, said head engaging said neck down diameter of the tubular member and resisting movement of said actuator mechanism by said thermal forces to assure that the actuator mechanism is located in said new rest position when the thermal forces dissipate as the pressure plate, friction disc and backing plate cools and the inertia forces cease when said maneuvers terminate to assure that the operational movement of the pressure plate from the rest position into engagement with the backing plate is substantially constant.

2. In the brake as recited in claim 1 wherein said plurality of openings initially are substantially circular and after contracting to the neck down diameter are substantially oval with the larger diameter perpendicular to the axis of the tubular member.

3. In the brake as recited in claim 2 wherein said tubular member includes:

a first cylindrical member having first and second flanges on the ends thereof, said spring engaging said first flange; and a second cylindrical member having a first end engageable with said head on the stem and a second end fixed to said second flange, said plurality of openings in radial planes being located in said second cylindrical member, said actuation mechanism engaging said second flange after moving and overcoming said spring to thereafter move the first and second cylindrical members and radially expand said second cylindrical member to move said first end with respect to said head.

4. In the brake, as recited in claim 3 wherein said spacing of the selected positions are at uniform distances.

5. In the brake, as recited in claim 4 wherein said plurality of openings includes at least two equally spaced aperatures, said aperatures having a diameter such that the sum of the diameters and the linear distance between the aperatures are substantially equal.

6. In the brake booster, as recited in claim 1 wherein said plurality of openings in said tubular member are initially rectangular and after the tubular member contracts to the neck down diameter are substantially parallelograms, said arcuate distance between the plurality of openings along the radial plane allowing said contraction to return to the expanded portion of the tubular member to a position where the neck down diameter is substantially equal to the initial diameter of the tubular member.

* * * * *